United States Patent [19]
Vollenweider et al.

[11] Patent Number: 5,942,681
[45] Date of Patent: Aug. 24, 1999

[54] ARRANGEMENT FOR MEASURING THE TIRE PRESSURE OF MOVING VEHICLES FROM THE TIRE CONTACT SURFACE

[75] Inventors: Kurt Vollenweider, Humlikon; Roland Sommer, Winterthur; Reto Calderara, Winterberg, all of Switzerland

[73] Assignee: K.K. Holding AG, Winterthur, Switzerland

[21] Appl. No.: 09/115,671

[22] Filed: Jul. 15, 1998

[30] Foreign Application Priority Data

Jul. 16, 1997 [CH] Switzerland .............................. 1738/97

[51] Int. Cl.$^6$ ...................................................... B60C 23/00
[52] U.S. Cl. .............................................. 73/146.2; 73/146
[58] Field of Search ..................... 73/146, 146.2

[56] References Cited

U.S. PATENT DOCUMENTS 4,630,470  12/1986  Brooke et al. ......................... 73/146.2
5,461,924  10/1995  Calderara et al. .......................... 73/786

*Primary Examiner*—Joseph L. Felber
*Attorney, Agent, or Firm*—Barnes & Thornburg

[57] ABSTRACT

The detector arrangement comprises a measuring rail with a number of individual elements each having a sensor mounted on a bottom rail and include rectangular elements as force introduction flanges, whose length in the direction of travel is a multiple of their width in the axial direction of the rail. The measuring rail is part of a measuring arrangement for detecting the tire pressures of vehicles in motion. The arrangement includes also at least one contact rail placed ahead of the measuring rail in the direction of travel, and a data acquisition facility. The vehicle speed is determined with the help of the contact rail. The measured values from the sensors yield a tire contact surface with an isobar pattern. From these two, the data acquisition can determine underinflation, normal pressure and overinflation of the individual wheels besides axle loads and vehicle weights, whereby underinflation and overinflation at least are displayed as faults.

8 Claims, 5 Drawing Sheets

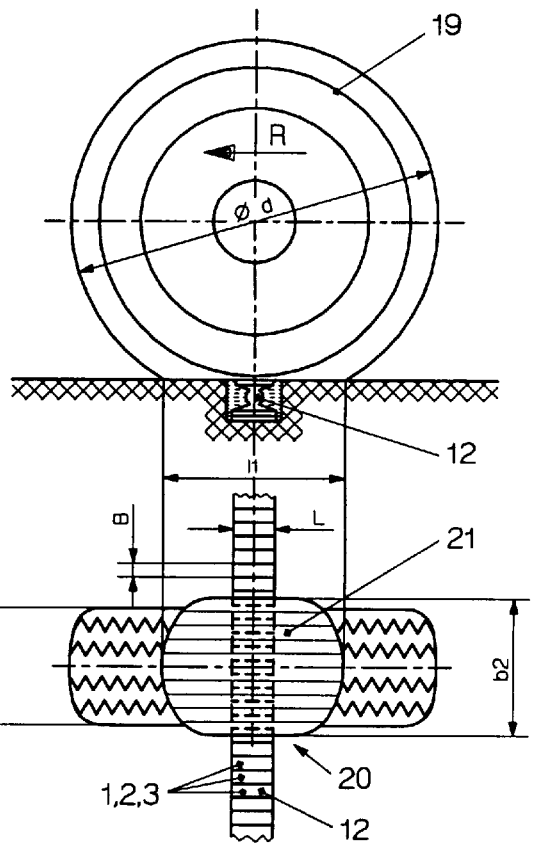
Fig.3
Fig.4
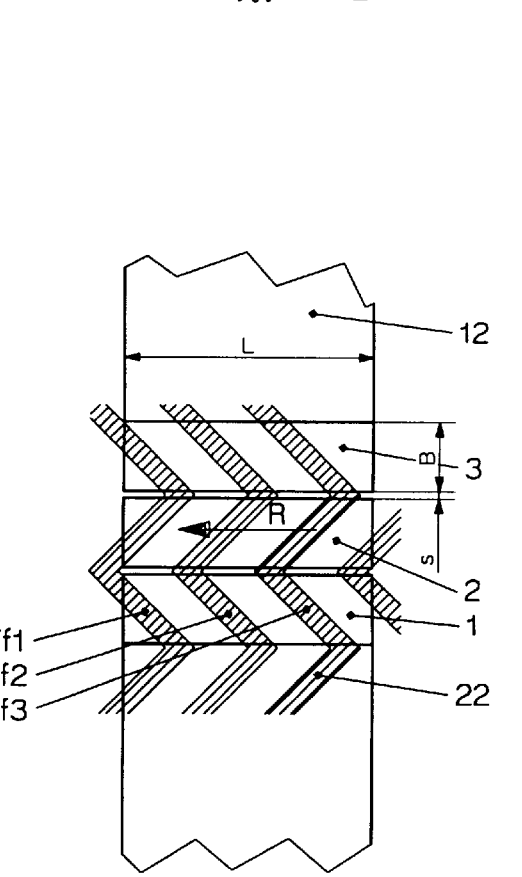
Fig.5

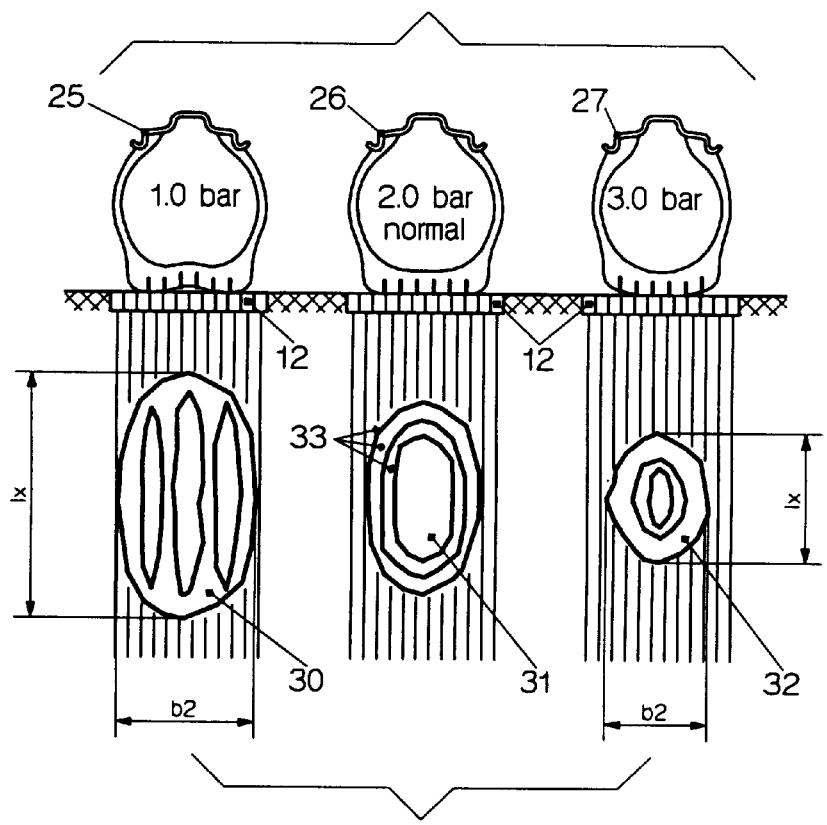
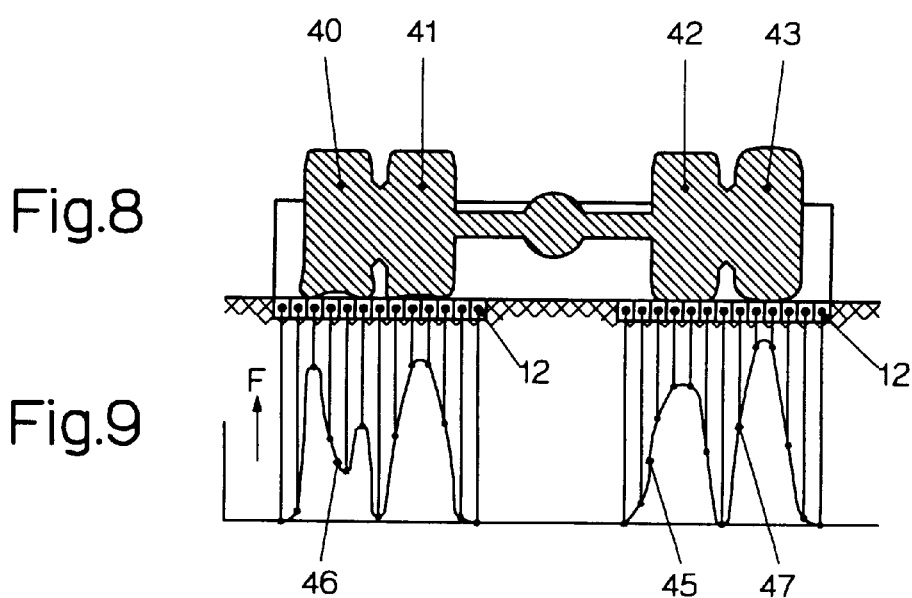

ARRANGEMENT FOR MEASURING THE TIRE PRESSURE OF MOVING VEHICLES FROM THE TIRE CONTACT SURFACE

BACKGROUND AND SUMMARY OF THE INVENTION

The invention relates to an arrangement for detecting the tire Pressure of wheels of a vehicle.

The idea of measuring the tire pressure of moving vehicles has existed in the literature since 30 years. During this time, dozens of patent proposals have been made known, though none of them found wider application. These failures were due on the one hand to the overly complex sensors, efficacious at best for laboratory duties, and on the other hand to the inadequate electronic evaluation and computing facilities which could not process the great data incidence fast enough.

Through the statistical evaluation of vehicle accidents it has been shown in Britain for example that 16% of the serious accidents occurred due to insufficient pressure in at least one of the wheels. In the USA, long-distance haulage firms have begun pumping up one tire of each twin pair with up to 30% overpressure, so that the rolling resistance is reduced and transport costs cut. However, the road surface is worn unduly by this, necessitating substantial repairs.

For both cases—underinflation and overinflation of the tire—metrologies are needed for revealing such offending vehicles in moving traffic and enabling them to be eliminated. Compared with the state of the art, using equipments measuring the tire pressure for laboratory purposes chiefly and hence moving slowly, much more is demanded nowadays by insurance companies, road maintenance authorities and traffic control centers. The measuring arrangement must be transferred from the protected laboratory atmosphere to the rigorous environment of motor roads and filling stations.

The state of the art is defined in U.S. Pat. No. 5,445,020 of Dec. 2nd 1993, describing a multiple arrangement of force measuring cells installed in a flat plate system, which may be laid anywhere as a mobile measuring mat for example, especially before filling stations. This mat has square force introduction elements arranged in several successive rows.

Also known from U.S. Pat. No. 5,461,924 is a tubular transducer with force introduction and force transmission flanges, which as sensors have a number of piezo-elements that may be connected singly or in groups. While this arrangement is able to register the individual pressures of twin tire, it cannot register several measuring points on the same tire owing to the cross-talk between individual neighboring measuring elements due to the rigid tube construction.

For a relative comparison between the individual wheels of a vehicle, a measuring arrangement is known from U.S. Pat. No. 4,630,470. Here the individual wheels are excited artificially to vibration, from which a frequency spectrum is recorded. By comparing the spectrums of the individual wheels, a wheel whose pressure deviates from the others is revealed by a changed frequency spectrum. This arrangement presupposes that the majority of the vehicle's wheels are inflated to the correct tire pressure, otherwise underinflated or overinflated tire cannot be identified.

The invention is therefore based on the need for a measuring arrangement allowing the exact tire contact surface to be determined with the isobars of each wheel, representing it arithmetically and comparing it with the other wheels. For this measuring and calculating operation a large number of overrunning segments, typically 10 at least, must be sensed for each wheel.

This task is fulfilled by the invention characterized in the claims, whereby for example the contact rail laid ahead serves to ascertain the vehicle's speed in conjunction with a measuring rail, and the division of the sensor into individual elements prevents cross-talking between neighboring measuring elements, while the dimensions of the rectangular elements ensure that the measuring rail registers the measured values of the wheel rolling over it even with widely differing tread patterns.

The data acquisition facility stores the individual tire contact surfaces at once temporarily, and compares special features of the isobar patterns with the tread prints of the other vehicle wheels. Since, however, the isobar patterns of heavy goods vehicles, which inflict the greatest damage upon the roads and also cause the most serious accidents generally, are very similar and comparable with each other regardless of the make or type of vehicle and/or tires, the isobar patterns may also be compared with the image of a "normal pressure" isobar for the particular vehicle stored in the data acquisition facility, which may be derived for example from the axle load detected at the same time and/or from the number of wheels or axles passing over the installation.

A pictorial presentation or an eliminate signal is available immediately after passage. Here the processing speed must be so high that vehicles with incorrect tire pressures can be taken out of normal road traffic. In this way, traffic monitoring by tire pressure states becomes possible.

The invention is presented in examples from the following illustrations:

BRIEF DESCRIPTION OF THE DRAWINGS

FIG. 3 A cross sectional view of a vehicle wheel running over a recessed force measuring rail shown in elevation.

FIG. 4 As FIG. 3 but in plan, showing tire contact surface.

FIG. 5 Looking onto the individual force measuring elements with a typical tire pressure profile.

FIG. 6 A cross sectional view of three tires on force measuring rails.

FIG. 7 A plan view of three corresponding tire contact surfaces with isobars.

FIG. 8 A cross sectional view of a truck rear axle with unequal tire pressures.

FIG. 9 A corresponding maximum pressure curves of the individual elements.

DETAILED DESCRIPTION OF THE PREFERRED EMBODIMENTS

Figure 1:
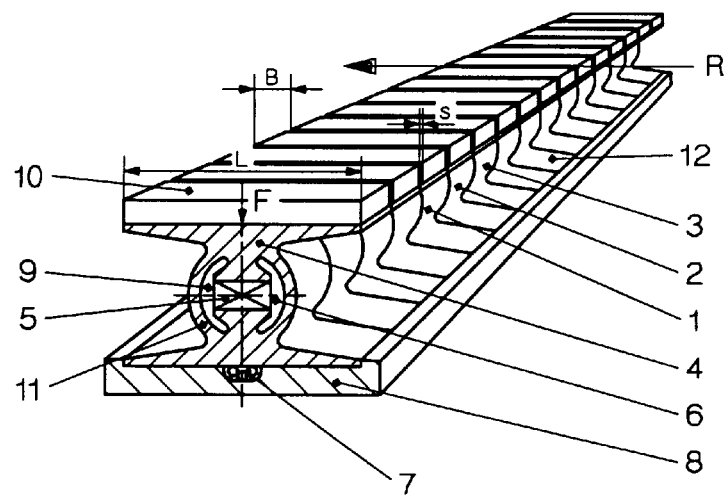
FIG. 1 A perspective view of individual force measuring elements arranged in-line and mounted on a common rail.

Shown in FIG. 1 is a measuring rail 12 according to the invention, with a row of force measuring elements 1,2,3 . . n, their width being designated with B and their length, viewed in the direction of travel R, with L. Each force measuring element 1,2,3 is provided with its own crystal array 5 as sensor, which under the action of a force F delivers a proportional electrical signal into a signal line 6. In the collective channel 7, the individual signal lines are led out to the data acquisition facility not shown. The individual cells 1,2,3 are sawn off from a metal profile consisting of force introduction flange, tubular part 11 and force sustaining flange. Accommodated in the tubular part 11 is the crystal array 5 under mechanical preload and potted in plastic 9. This potting protects the crystal array 5 which is susceptible to moisture. The individual force measuring elements 1,2,3 . . . each have a sand-epoxy slab 10. After instalation, these can be ground over with the road surface. The interstices S between the individual force measuring elements 1,2,3 are kept as small as possible and grouted with polyurethane casting resin.

The overall length of a measuring rail 12 may be 1 m or more for example. With a single element having a width B of 20 mm it accommodates some 50 or more force measuring elements 1,2,3 mounted on the bottom rail 8.

Figure 2:
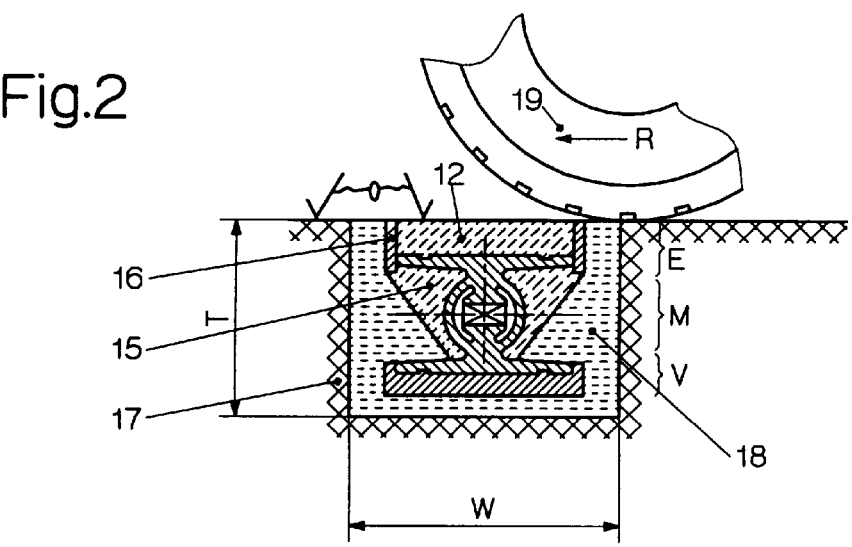
FIG. 2 A cross sectional view of a force measuring rail fitted in a road groove.

In accordance with FIG. 2, the installed measuring rail 12 is provided before installation with side cushions 15 consisting of potting compound and rubber band 16, after which it is potted secure with a compound 18 in the prepared road groove 17. According to the invention, the depth T and width W of the road groove 17 are roughly equal, ensuring a firm anchorage even under moving traffic.

The upper part E of the measuring rail 12 constitutes the force introduction part, the middle part M the signal conversion part, and V the anchorage part. The surface O is made flush with the road surface by grinding. The tire 19 is about to roll onto the measuring rail 12.

Figure 2A:
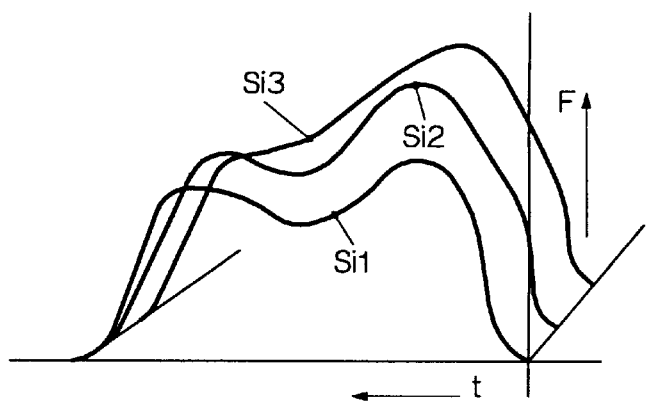
FIG. 2a Pressure curves of individual force measuring elements when run over as in FIG. 2.

According to FIG. 2a, the passage of the tire 19 sets up an overrolling signal $Si_1$, $Si_2$, $Si_3$. . . , proportional to the force F versus the time scale t in each individual force measuring element 1,2,3 . . . These overrolling signals and the travelling speed v form the main parameters of the following calculations in the data acquisition facility.

FIG. 3 shows the tire 19 in elevation exactly above the installed measuring rail 12.

FIG. 4 shows FIG., 3 in plan view above the measuring rail 12. The tire contact surface 20 is usually wider than the tire width $b_1$. The measuring rail 12 with the individual force measuring elements 1,2,3 and their width B divides the tire contact surface 20 into at least 8 to 10 subsections 21, enabling a satisfactory resolution of the subsequent computer output.

FIG. 5 shows the measuring rail 12 in plan, view with the individual force measuring elements 1,2,3 and an average tire tread pattern 22 superimposed, in the travel direction R. So that at least three part surfaces $T_{f1}$, $T_{f2}$, $T_{f3}$ of the tread 22 lie upon each individual force measuring element 1,2,3, they should be at least 50 mm in length or thereabouts.

To obtain satisfactory resolution, a minimum width B of 15 mm for the individual force measuring elements has proved advantageous, giving a ratio L:B around 3.0. These basic data yield optimal result accuracy in relation to the technical outlay and hence to the overall costs and long-term reliability.

FIG. 6 shows three tire states above the measuring rail 12 namely underinflated tire 25, normal tire pressure 26 and overinflated tire 27.

FIG. 7 shows three calculated tire contact surfaces 30,31, 32 with lengths lx and widths b2. The isobars 33 (lines of equal pressure distribution) provide information on the distribution of the bearing forces and correlate directly with the tire pressure.

To assess the tire pressure, various evaluation methods may be chosen from the data calculated in this way. With appropriate programming and data acquisition, absolute values of the particular tire pressure for example may be determined from the vehicle speed measured with the help of the contact rail laid ahead and the lengths lx of the tire contact surfaces drawn in.

For purposes of comparison on the same vehicle it is sufficient to compare the lengths lx. More exact is a comparison of the surfaces. Thus from the shape of the isobars for example it can be seen whether a tire is under-, normally or over-inflated.

FIG. 8 shows a vehicle's rear axle with two twin tires each above a measuring rail 12 for underinfated tire 40, normally inflated tires 41 and 42 and overinflated tire 43.

FIG. 9 plots the peak values of the tires shown in FIG. 8 as they pass over the measuring rail 12. Sufficient for evaluating such comparative data are the maxima of the individual overrolling signals $Si_1$, $Si_2$, $Si_3$, which yield the cumulative curves 46 for underinflation, 45 for normal pressure and 47 for overinflation and are easily calculated. From the areas of the curves 45 to 47 the computer can also calculate at once the left and right axle loads separately.

Figure 10:
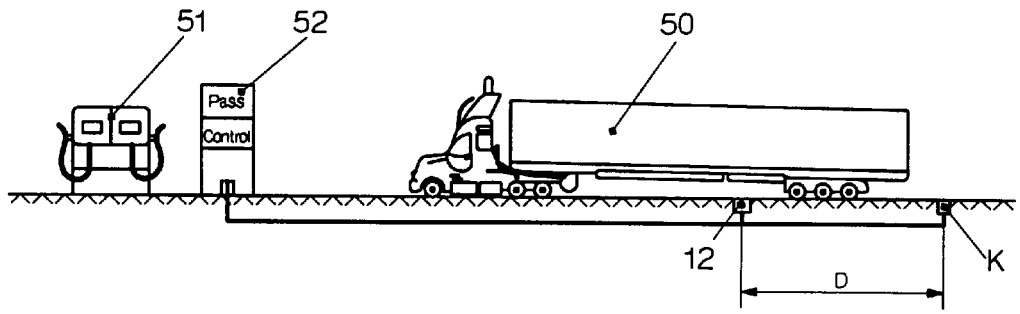
FIG. 10 A schematic view of a truck driven into a filling station.

FIG. 10 shows a typical application with a goods vehicle 50 driving into a filling station. Upon reaching the fuel pump 51 the display panel 52 already shows the information from the overrolled measuring rail 12 and the contact rail K recessed a few meters ahead of it.

Figure 11:
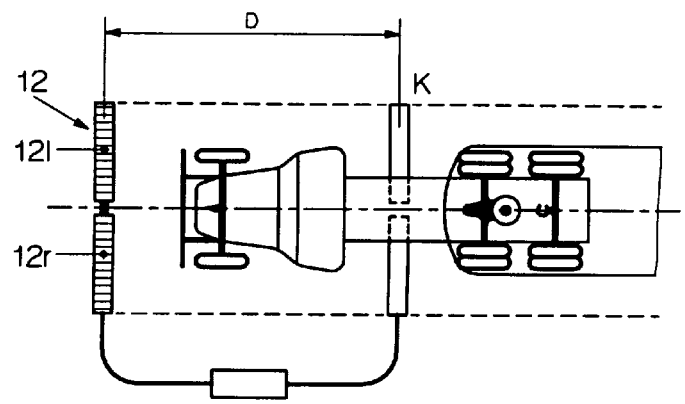
FIG. 11 Detail from FIG. 10 in plan.

FIG. 11 shows in plan view how the measuring rail is divided in the middle of the roadway and disposed in relation to the travel direction 12 l of the left roadway half and 12 r of the right half. This in turn allows simultaneous determination of the tire states and summation of the axle weights of the left and right halves of the vehicle.

Figure 12:
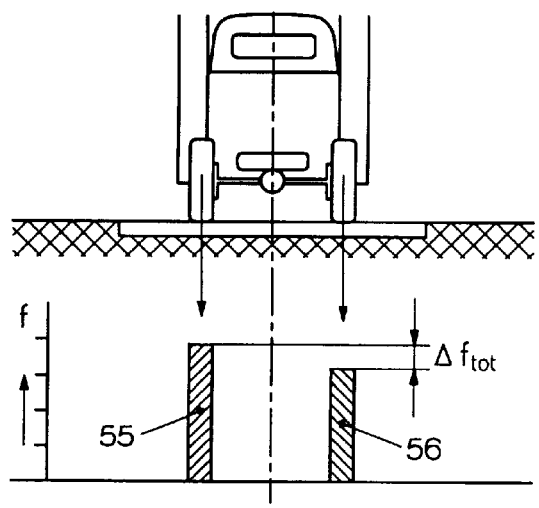
FIG. 12 A schematic view of a loading state in relation to vehicle centerline.

In this way, as indicated in FIG. 12, any excess weights as well as the load distribution can be verified at once. The summation of the axle weights left is shown at 55 and the summation of the axle weights right is shown at 56, along with the difference of force $\Delta f_{tot}$. This enables the filling station proprietor to offer a useful additional service. Similarly valuable automated data may be appreciated at goods vehicle terminals.

Figure 13:
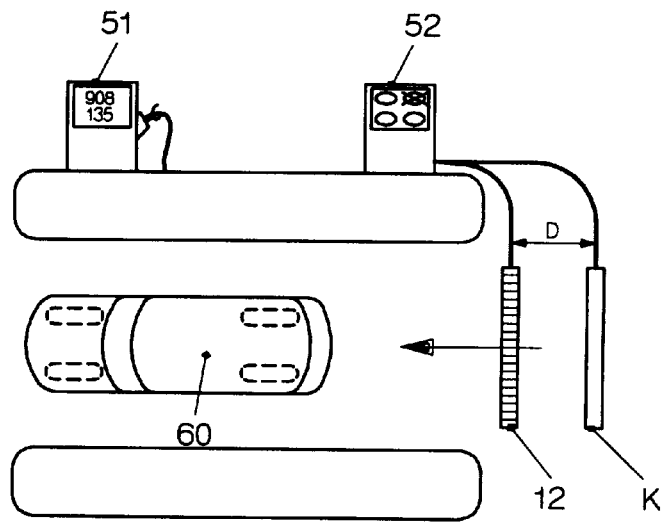
FIG. 13 A schematic view of a car driven into a filling station.

FIG. 13 shows a similar situation for passenger cars 60. After stopping at the filling station 51, the tire state can be displayed at once on an information panel 52 by simple visual signalling.

Figure 14:
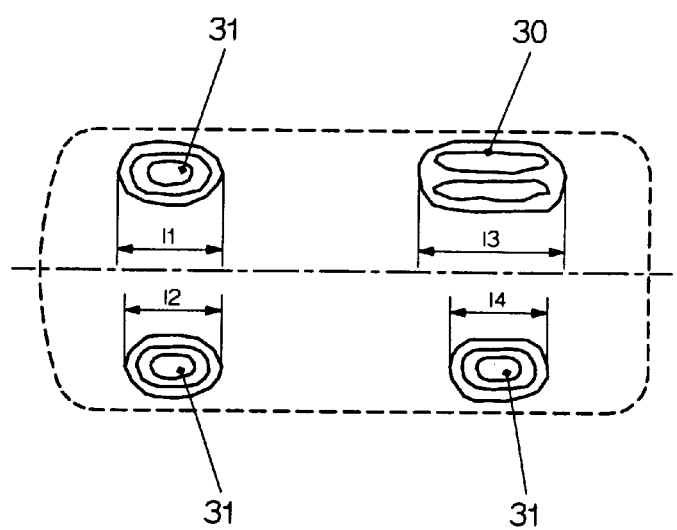
FIG. 14 A schematic view of a calculated tire contact surfaces of car in FIG. 13.
Figure 15:
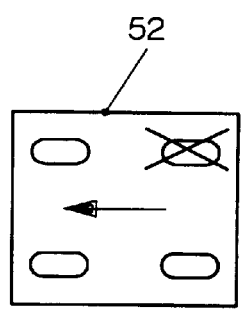
FIG. 15 Evaluation panel for pressure of all tires.

According to FIG. 14 this requires merely comparison of the four lengths $l_1$, $l_2$, $l_3$, $l_4$, and the excessive length $l_3$ is indicated by a red light on the panel (FIG. 15). Through this relative comparison, sufficiently exact information regarding the tire state can be obtained in simple fashion. This again is a further service provided by the filling station proprietor.

Operators of large vehicle fleets would also be well advised to register automatically the tire states of vehicles starting out, displaying them on panels at the exit and at the same time recording them for operational surveillance.

The arrangement according to the invention can thus render significant contributions to enhanced security in road traffic by detecting inadmissible tire pressure states in moving vehicles and eliminating them. The invention furthermore makes possible additional automated security testing at vehicle terminals or filling stations.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A sensor arrangement for installing in roadways to detect the tire pressures of the wheels of a vehicle during normal travel, comprising a measuring rail having individual elements with sensors disposed in a line transverse to the direction of travel, each having a force introducing flange and an opposed force sustaining flange, a contact rail positioned ahead of the measuring rail in the direction of travel and a data acquisition facility connected to the measuring and the contact rails, the individual elements being rectangular and whose length in the direction of travel is a multiple of their width, the data acquisition facility determines the vehicle velocity and the pressure load of each wheel from the measuring and contact rails to detect the tire pressure.

2. A sensor arrangement according to claim 1, wherein each individual element has a cover slab consisting of a sand and epoxy mixture and a gap with the neighboring slab being grouted with an elastic plastic.

3. A sensor arrangement according to claim 1, wherein the width of the individual elements measure not more than 20 mm and a spaced not more than 0.5 mm from the neighboring element.

4. A sensor arrangement according to claim 1, wherein the sensor arrangement is installed in the approach to a filling station; and including a display visually indicating individual tire inflations upon stopping to refuel, showing whether and which tires need their pressures checked.

5. A sensor arrangement according to claim 1 wherein the sensor arrangement is installed in the approach or exit of bus or truck terminals; and including visual display and automatic recording for monitoring vehicles to verify proper tire inflation.

6. A sensor arrangement according to claim 1, including software in the data acquisition facility which also totals the forces of the individual tires on the left and right halves of the vehicle at the same time as determining the tire pressure distribution, in order to reveal any shifts of equilibrium.

7. A sensor arrangement according to claim 1, including a supplement to the data acquisition facility for simultaneously adding the bearing forces of all tires and displaying them, so that the overall vehicle weight is registered and its roadworthiness is automatically recorded in terms of tire pressures, load symmetry and overall weight, yielding reference data in the event of possible damage.

8. A procedure for detecting the tire pressures of the individual wheels of a vehicle during travel, using the sensor arrangement according to claim 1, characterized by the following steps:

detecting the vehicle speed by chronometry after each individual wheel touches the contact rail laid at a certain distance;

directing the pressure load imposed by each wheel running over the measuring rail versus the time by means of a number of sensors disposed over the wheel width;

detecting the shape and strength of the pressure distribution profiles over the width of each wheel as the wheel runs over the measuring rail, calculating, from the shape and strength of the pressure distribution profiles, the tire contact area and the mean pressure of each wheel; and comparing the pressure distribution profiles ascertained for the individual wheels with a normal pressure profile for the particular tire and vehicle.

* * * * *